United States Patent [19]

Fritsche

[11] Patent Number: 5,003,461
[45] Date of Patent: Mar. 26, 1991

[54] CLUSTER CONTROLLER MEMORY ARBITER

[75] Inventor: David L. Fritsche, Tempe, Ariz.

[73] Assignee: Motorola, Inc., Schaumburg, Ill.

[21] Appl. No.: 150,870

[22] Filed: Feb. 1, 1988

[51] Int. Cl.⁵ ............................................. G06F 13/00
[52] U.S. Cl. ................................. 364/200; 364/228.1; 364/238.4; 364/239
[58] Field of Search ............... 364/200, 200 MS File, 364/900 MS File

[56] References Cited

U.S. PATENT DOCUMENTS

| | | | |
|---|---|---|---|
| 4,096,572 | 6/1978 | Namimoto | 364/200 |
| 4,302,808 | 11/1981 | Zanchi et al. | 364/200 |
| 4,339,808 | 7/1982 | North | 364/900 |
| 4,536,839 | 8/1985 | Shah et al. | 364/200 |
| 4,562,535 | 12/1985 | Vincent et al. | 364/200 |
| 4,688,172 | 8/1987 | Wright | 364/200 |
| 4,701,878 | 10/1987 | Gunkel et al. | 364/900 |
| 4,773,005 | 9/1988 | Sullivan | 364/200 |
| 4,847,757 | 7/1989 | Smith | 364/200 |
| 4,858,173 | 8/1989 | Stewart et al. | 364/900 |
| 4,942,550 | 7/1990 | Murray | 364/900 |
| 4,954,979 | 9/1990 | Eibner et al. | 364/900 |

*Primary Examiner*—Michael R. Fleming
*Assistant Examiner*—Gopal C. Ray
*Attorney, Agent, or Firm*—Raymond Warren

[57] ABSTRACT

A memory arbiter for a cluster controller having a protocol controller, a main processing unit (MPU) and a shared common global random access memory (RAM) wherein a combination of buffers and latches enable zero wait-state access to the common global RAM to be zero-wait-state for the MPU. This result is achieved by the common global RAM inserting wait-states on the protocol controller whenever both the protocol controller and the MPU are requesting access of the common global RAM.

3 Claims, 1 Drawing Sheet

CLUSTER CONTROLLER MEMORY ARBITER

TECHNICAL FIELD

This invention pertains to memory arbitration in a computer system and, in particular, to the arbitration of a common global RAM in a cluster controller.

BACKGROUND OF THE INVENTION

The purpose of a cluster controller is to take high speed serial data coming from a host computer and multiplex it to one of a plurality of asynchronous serial ports. Similarly, the cluster controller must also be able to accept data from a plurality of low speed asynchronous serial ports and send it back to the host via a high speed (multiplexed) return serial path.

The cluster controller hardware commonly consists of a main processing unit (MPU) and a protocol controller that communicate through a common global random access memory (RAM) area. A commonly used protocol controller is manufactured by Motorola, Inc. and is referred to as a X.25 protocol controller (XPC).

The MPU transfers information directly to and from the host computer, while the protocol controller of the cluster controller may be linked to a remote cluster which controls a plurality of peripheral units. The common global RAM can be accessed by either the MPU or the protocol controller. To ensure proper functioning of the system, only the MPU or the protocol controller is granted access to the common global RAM at a single time.

The function of insuring access to the common global RAM is performed by a memory arbiter. Prior art memory arbiters granted access to either the protocol controller or the MPU at a single time. When the common global RAM was being utilized by one, the other had to wait for access. Since information flow from the MPU is often more vital to efficient operation of the system than information flow from the protocol controller, inefficient operation resulted when the protocol controller was accessing the common global RAM and the MPU made a request for access.

SUMMARY OF THE INVENTION

It is an object of the present invention to provide a new and improved cluster controller memory arbiter which provides zero wait-states for an MPU while inserting one or more wait-states for a protocol controller whenever both the MPU and the protocol controller are requesting access to a common global memory.

It is a further object of the present invention to provide a new and improved cluster controller memory arbiter wherein the MPU is provided with a direct path to the protocol controller in order to allow the MPU to access the internal registers of the protocol controller, acknowledge interrupts, and otherwise control the protocol controller's operation in the system.

The aforementioned and additional objects and advantages of the present invention are achieved by utilizing latches and buffers in the global RAM address and data paths which essentially delay an acknowledgement signal received by the protocol controller whenever the MPU requests access to the common global memory area. When access to the protocol controller is interrupted, transfers already initiated ar maintained in the buffers of the global RAM path.

The increased system performance of the present invention will become apparent to those skilled in the art upon consideration of the accompanying specification, claims and drawings.

BRIEF DESCRIPTION OF THE DRAWINGS

Referring to the drawings wherein like characters indicate like parts throughout the figures.

DESCRIPTION OF THE PREFERRED EMBODIMENT

Figure 1:
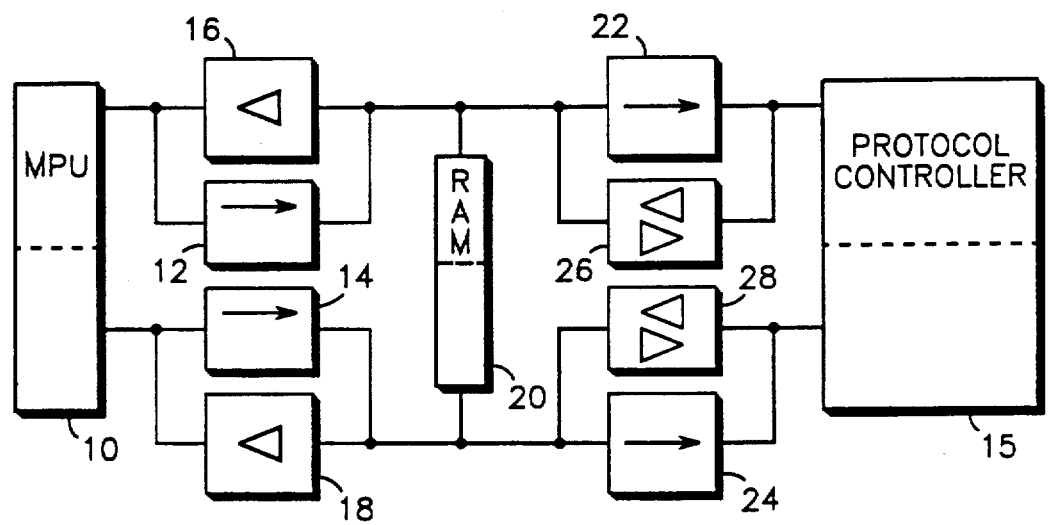
FIG. 1 is a block diagram of global RAM data paths between an MPU, protocol controller, and a shared global RAM as utilized in the present invention.

Referring specifically to FIG. 1, the data path between an MPU 10, a protocol controller 15, and a global RAM 20 is shown. Global RAM 20 is commonly shared between MPU 10 and protocol controller 15.

Referring to the portion of FIG. 1 containing MPU 10 and global RAM 20, latches 12 and 14 are shown. Latches 12 and 14 are used to transmit information from MPU 10 to global RAM 20. In the present embodiment, since MPU 10 and RAM 20 operate on a 16-bit word configuration and latches 12 and 14 are 8-bit latches, two latches are required for data transfer in FIG. 1, since each latch can control only half the data of MPU 10. It should be noted that latch 12 transfers that data illustrated in the logical upper half data lines (MSB half) of MPU 10 to the logical upper half data lines (MSB half) of RAM 20. Similarly, latch 14 transfers the data illustrated in the logical lower half data lines (LSB half) of MPU 10 to the logical lower half data lines (LSB half) of RAM 20. Thus, data consistency is maintained.

Directional buffers 16 and 18 connected between MPU 10 and global RAM 20 permit data flow from global RAM 20 to MPU 10. Again it should be noted that the corresponding halves of MPU 10 and global RAM 20 are coupled through their upper and lower data lines for the same reasons as set forth above.

Referring now to the portion of FIG. 1 containing protocol controller 15 and global RAM 20, bi-directional buffers 26 and 28 are used to transfer data from protocol controller 15 to common global RAM 20. Data may also be transferred from common global RAM 20 to protocol controller 15 through latches 22 and 24.

Buffers 26 and 28 create a direct path to protocol controller 15 from MPU 10. This direct path to protocol controller 15 allows MPU 10 to access the internal registers of protocol controller 15, acknowledge interrupts, and otherwise control the operation of protocol controller 15. Global memory 20 is capable of inserting one or more wait-states to the protocol controller whenever MPU 10 is accessing memory 20. Thus, MPU 10 has zero wait-states for access to global memory 20.

In summary, FIG. 1 illustrates data paths which essentially operate so as to make protocol controller 15 the slave and MPU 10 the master of the circuit. MPU 10 gets immediate access to global RAM 20 whenever it requests such access, while protocol controller 15 must wait to be granted access. This allows MPU 10 to run at full speed without having to wait for memory contention with protocol controller 15.

Figure 2:
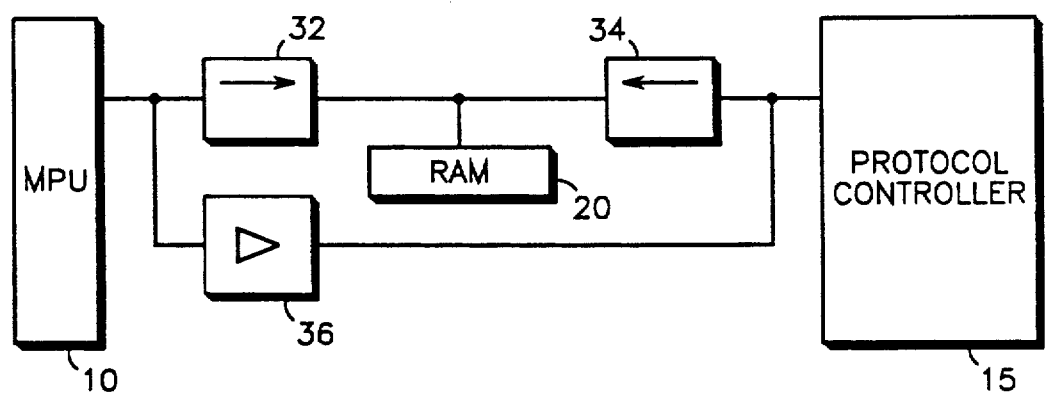
FIG. 2 is a block diagram of global RAM address paths between an MPU, protocol controller, and a shared global RAM as utilized in the present invention.

Referring specifically to FIG. 2, the address paths between MPU 10, protocol controller 15, and global RAM 20 are illustrated. Both MPU 10 and protocol controller 15 have an address path direct to commonly shared global RAM 20. The path between MPU 10 and global RAM 20 is through latch 32, and the address path between protocol controller 15 and global RAM 20 is through latch 34. Once again, MPU 10 has a direct path to protocol controller 15. This path is illustrated through buffer 36. Thus, MPU 10 can control protocol controller 15 similarly as described with reference to FIG. 1.

Although not shown in either of the figures, it should be understood by those skilled in the art that MPU 10 also has a direct path to a local memory area. This local memory is accessible to MPU 10 under a zero-wait-state and is used for temporary storage of registers, stack, and other scratch-pad needs.

In summary, a cluster controller with a shared global memory and an associated global memory arbitration system have been shown which allow a high speed MPU to run at full speed without having to wait for the delay incurred when a protocol controller is utilizing the global memory. Thus, an efficient connection between a host computer connected to the MPU and a cluster controller connected to the protocol controller is achieved.

While a specific embodiment of this invention has been shown and described, further modifications and improvements will occur to those skilled in the art. For instance, if a smaller memory is required, only one latch may be required between the MPU and the global memory in the protocol controller and the global memory. I desire it to be understood, therefore, that this invention is not limited to the particular form shown, and I intend to cover all modifications which do not depart from the spirit and scope of this invention.

I claim:

1. A cluster controller memory arbiter comprising:
   a controller having a first data line;
   a processor having a first data line;
   a shared memory having a first data line;
   a first latch coupled between said first data line of said processor and said first data line of said shared memory which permits data flow only from said processor to said shared memory;
   a first directional buffer coupled between said first data line of said processor and said first data line of said shared memory for controlling data flow only from said shared memory to said processor;
   a first bi-directional buffer coupled between said first data line of said shared memory and said first data line of said controller for controlling data flow between said processor or said shared memory and said controller; and
   a second latch coupled between said first data line of said shared memory and said first data line of said controller for controlling data flow only from said shared memory to said controller.

2. The cluster controller of claim 1 further comprising:
   a third latch coupled between a second data line of said processor and a second data line of said shared memory which permits data flow only from said processor to said shared memory;
   a fourth latch coupled between a second data line of said controller and said second data line of said shared memory for controlling data flow only from said shared memory to said controller;
   a second directional buffer coupled between said second data line of said processor and said second data line of said controller which allows only said processor access to said controller; and
   a second bi-directional buffer coupled between said second data line of said shared memory and said second data line of said controller for controlling data flow between said processor or said shared memory and said controller.

3. A cluster controller memory arbiter comprising:
   a controller having a plurality of data lines logically divided into a first half and a second half;
   a processor having a plurality of data lines logically divided into a first half and a second half;
   a shared memory having a plurality of data lines logically divided into a first half and a second half;
   a first latch coupled between said first half data lines of said processor and said first half data lines of said shared memory which permits data flow from said first half data lines of said processor to said first half data lines of said shared memory;
   a second latch coupled between said second half data lines of said processor and said second half data lines of said shared memory which permits data flow from said second half data lines of said processor to said second half data lines of said shared memory;
   a first directional buffer coupled between said processor and said shared memory for controlling data flow from said first half data lines of said shared memory to said first half data lines of said processor;
   a second directional buffer coupled between said processor and said shared memory for controlling data flow from said second half data lines of said shared memory to said second half data lines of said processor;
   a first bi-directional buffer coupled between said first half data lines of said shared memory and said first half data lines of said controller for controlling data flow between said processor or said shared memory and said controller;
   a second bi-directional buffer coupled between said second half data lines of said shared memory and said second half data lines of said controller for controlling data flow between said processor or said shared memory and said controller;
   a third latch coupled between said first half data lines of said shared memory and said first half data lines of said controller which permits data flow from said first half data lines of said shared memory to said first half data lines of said controller; and
   a fourth latch coupled between said second half data lines of said shared memory and said second half data lines of said controller which permits data flow form said second half data lines of said shared memory to said second half data lines of said controller.

* * * * *